US011965355B2

United States Patent
(12) United States Patent
Luan et al.

(10) Patent No.: US 11,965,355 B2
(45) Date of Patent: Apr. 23, 2024

(54) AUTOMATICALLY RESETTABLE PASSIVE SWING BOLT LOCK

(71) Applicant: XIAMEN MAKE SECURITY TECHNOLOGY CO., LTD., Fujian (CN)

(72) Inventors: Guanghui Luan, Xiamen (CN); Yibin Shen, Xiamen (CN)

( * ) Notice: Subject to any disclaimer, the term of this patent is extended or adjusted under 35 U.S.C. 154(b) by 335 days.

(21) Appl. No.: 17/617,311

(22) PCT Filed: Jun. 14, 2019

(86) PCT No.: PCT/CN2019/091245
§ 371 (c)(1),
(2) Date: Dec. 8, 2021

(87) PCT Pub. No.: WO2020/248219
PCT Pub. Date: Dec. 17, 2020

(65) Prior Publication Data
US 2022/0220770 A1 Jul. 14, 2022

(51) Int. Cl.
*E05B 15/04* (2006.01)
*E05B 47/00* (2006.01)

(52) U.S. Cl.
CPC .......... *E05B 15/04* (2013.01); *E05B 47/0012* (2013.01); *E05B 2015/0434* (2013.01); *E05B 2015/0496* (2013.01)

(58) Field of Classification Search
CPC ........ E05B 15/00; E05B 15/04; E05B 15/101; E05B 15/143; E05B 3/065; E05B 2015/0434; E05B 2015/0496; E05B 47/00; E05B 47/0012; E05C 19/06
USPC .......................................................... 70/275
See application file for complete search history.

(56) References Cited

U.S. PATENT DOCUMENTS

2018/0073275 A1* 3/2018 Ullrich ............... G07C 9/00182

FOREIGN PATENT DOCUMENTS

| | | | | |
|---|---|---|---|---|
| CN | 107514186 A | * 12/2017 | ............. | E05B 15/04 |
| CN | 108915377 A | * 11/2018 | ............. | E05B 15/00 |
| WO | WO-2009061144 A2 | * 5/2009 | ......... | E05B 47/0642 |
| WO | WO-2017191518 A1 | * 11/2017 | .............. | E05B 11/02 |

* cited by examiner

*Primary Examiner* — Nathan Cumar

(57) ABSTRACT

Disclosed is an automatically resettable passive swing bolt lock consisting of a lock body and a key. The key can be inserted into a locking hole of the lock body. In the present invention, the lock body comprises a lock housing, a rotary compartment, a lock cover, a reset spring, a pin spring, a pin, a lock body PCB, a motor, a cam, a reset pusher block, and two locking contacts. In the lock body, the rotary compartment is installed inside the lock housing. The lock body PCB, the motor and the cam are installed in an internal cavity of the rotary compartment formed by the lock cover and the rotary compartment. The invention has a small size and a simple structure, and the motor thereof has low power consumption.

6 Claims, 6 Drawing Sheets

AUTOMATICALLY RESETTABLE PASSIVE SWING BOLT LOCK

BACKGROUND OF THE INVENTION

1. Field of the Invention

The present invention relates to a lock, and more particularly to an automatically resettable passive swing bolt lock.

2. Description of the Prior Art

With the improvement of economic level, electronic locks are widely used in homes, hotels, enterprises, public places and other places. Passive locks are more and more widely used. The technique of passive locks is enhanced. However, conventional passive locks have the following shortcomings: (1) it is inconvenient to lock the conventional passive locks; (2) the conventional passive locks are large in size, high in power consumption, and require high motor performance; (3) the conventional passive locks need to be reset by powering on the motor; (4) the conventional passive locks have a complex structure, high cost, and high performance requirements for various parts.

SUMMARY OF THE INVENTION

The primary object of the present invention is to provide an automatically resettable passive swing bolt lock, which has a simple structure and good safety.

In order to achieve the above object, the present invention adopts the following technical solutions.

An automatically resettable passive swing bolt lock consists of a lock body and a key. The key is configured to be inserted into a locking hole of the lock body.

The lock body comprises a lock housing, a rotary compartment, a lock cover, a reset spring, a pin spring, a pin, a lock body PCB, a motor, a cam, a reset pusher block, a steel ball, two locking contacts, and a grounding conductor. The lock cover is buckled on the rotary compartment. A rotary compartment internal cavity is formed between the lock cover and the rotary compartment. The rotary compartment with the lock cover is rotatably fitted in the lock housing. An outer end of the rotary compartment is provided with two conductive holes. The cam is fixedly sleeved on an output shaft of the motor. The motor is fixedly fitted in the rotary compartment internal cavity. The two locking contacts are movably fitted in the two conductive holes of the rotary compartment. Outer ends of the locking contacts face a key hole of the lock housing. Inner ends of the locking contacts are electrically connected to the motor. The reset pusher block is movably fitted in the rotary compartment internal cavity to be moved back and forth in a longitudinal direction. An outer end face of the reset pusher block faces the key hole of the lock housing. An inner end of the reset pusher block is movably fitted with the cam. The reset spring is disposed between the reset pusher block and a wall of the rotary compartment internal cavity. An upper portion of the pin is movably fitted on the lock cover along a lateral direction. A lower end of the pin abuts against the cam. The pin spring is sleeved on the pin. Two ends of the pin spring lean against the lock cover and the cam, respectively. The steel ball is movably fitted in the rotary compartment internal cavity, and the steel ball is located on a side wall of the key hole of the rotary compartment. Both the lock body PCB and the grounding conductor are installed in the rotary compartment internal cavity. The lock body PCB is electrically connected to the motor and the locking contacts. The grounding conductor is in contact with the reset pusher block.

The cam has a cam body, a cam engaging block, a cam limiting block, a cam inclined surface, a cam cylindrical surface, and a cam arcuate groove. The cam limiting block extends outwardly from an outer end of the cam body. The cam arcuate groove is formed on an outer wall of the cam body. The cam engaging block extends outwardly from a side wall of the cam body. The cam inclined surface is formed on an inner end of the cam body. The cam cylindrical surface protrudes inwardly from the cam inclined surface.

The reset pusher block is an L-shaped member. The L-shaped member has a vertical section. An inner side wall of the vertical section is provided with an arcuate sleeve. The arcuate sleeve has an inclined end face matched with the cam cylindrical surface of the cam.

The automatically resettable passive swing bolt lock further comprises a fixing plate, a tongue, and a tongue nut. The fixing plate is fitted in the rotary compartment internal cavity. The fixing plate is movably sleeved on an outer end of the pin. The tongue is fixedly connected to an inner end of the rotary compartment through the tongue nut.

The key includes a key housing, a key head, a guide plate, two return pins, a grounding spring, a battery, a grounding elastic plate, an electrode elastic plate, and a key PCB. The key head is fixed at a front end of the key housing. A front end of the key head is formed with a steel ball groove for the steel ball in the lock body to be engaged therein. The guide plate is movably fitted in the key head. The return pins are movably inserted in guide holes of the key head. The grounding spring is sleeved on the corresponding return pin. Two ends of the grounding spring are respectively pressed against a flange of the corresponding return pin and the key housing to provide a spring force to push the corresponding return pin outwardly. The battery is installed in the key housing. The grounding elastic plate and the electrode elastic plate are installed on an inner wall of the key housing. The grounding elastic plate and the electrode elastic plate are in contact with two electrodes of the battery respectively, and are electrically connected to the key PCB and the two return pins through wires.

After adopting the above solutions, the lock body of the present invention comprises a lock housing, a rotary compartment, a lock cover, a reset spring, a pin spring, a pin, a lock body PCB, a motor, a cam, a reset pusher block, a steel ball, two locking contacts, and a grounding conductor. The rotary compartment is installed in the lock housing. The lock body PCB, the motor and the cam are all installed in the rotary compartment internal cavity formed between the lock cover and the rotary compartment. It has the advantages of small size, simple structure, and low power consumption of the motor.

Embodiments of the present invention will now be described, by way of example only, with reference to the accompanying drawings.

DETAILED DESCRIPTION OF THE PREFERRED EMBODIMENTS

Figure 1:
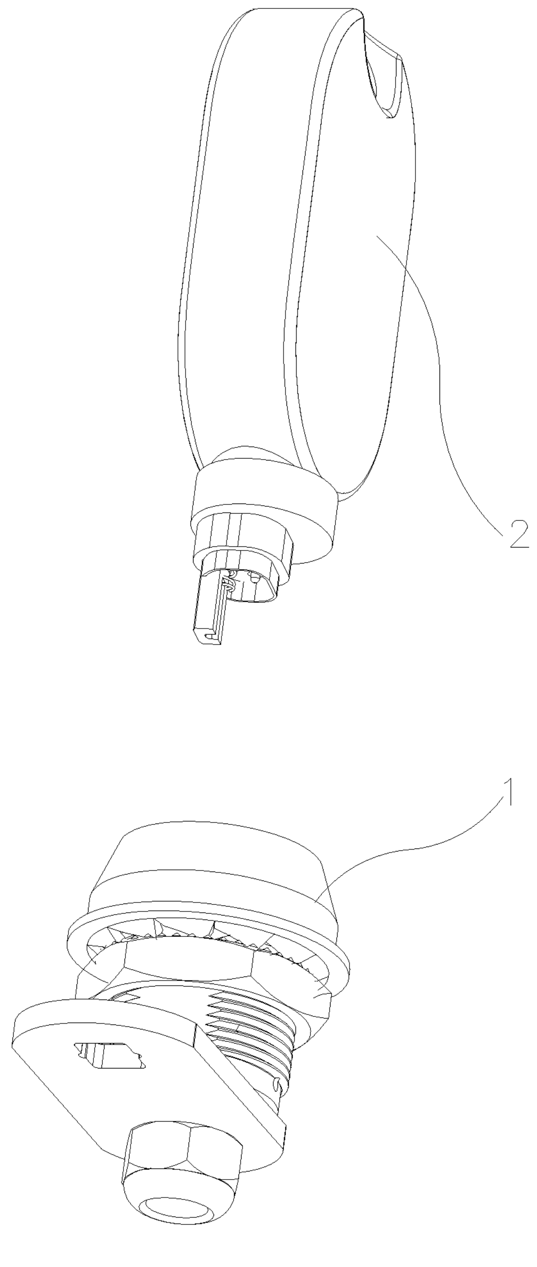
FIG. 1 is a perspective view of the present invention.
Figure 2:
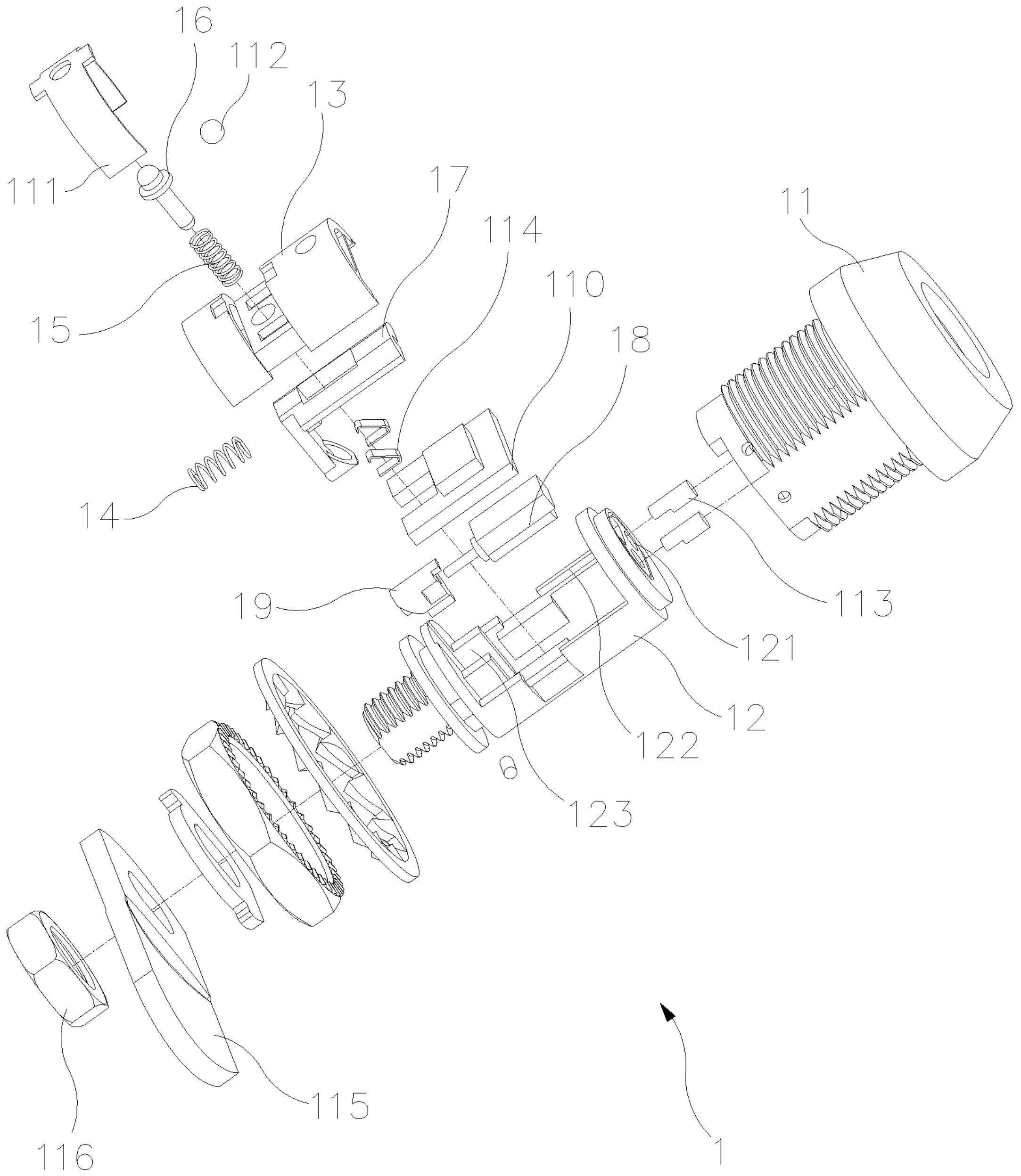
FIG. 2 is an exploded view of the present invention.
Figure 3:
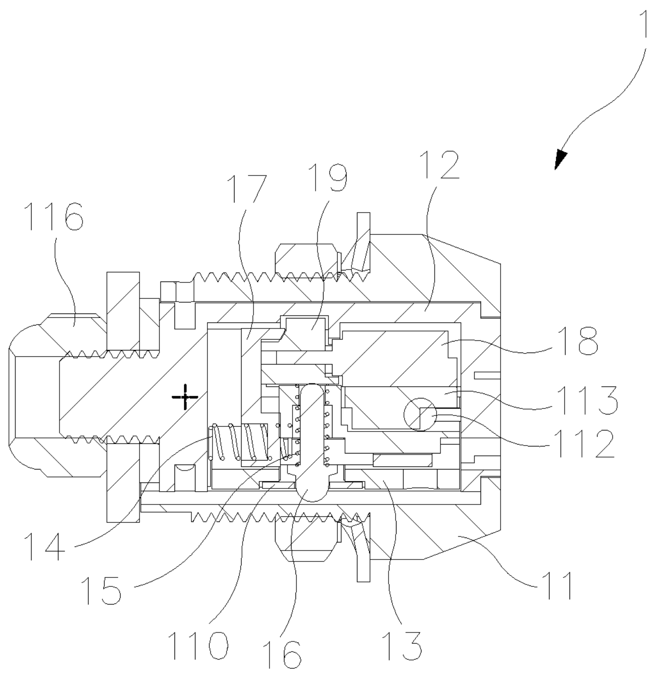
FIG. 3 is a cross-sectional view of the present invention in a locked state.
Figure 4:
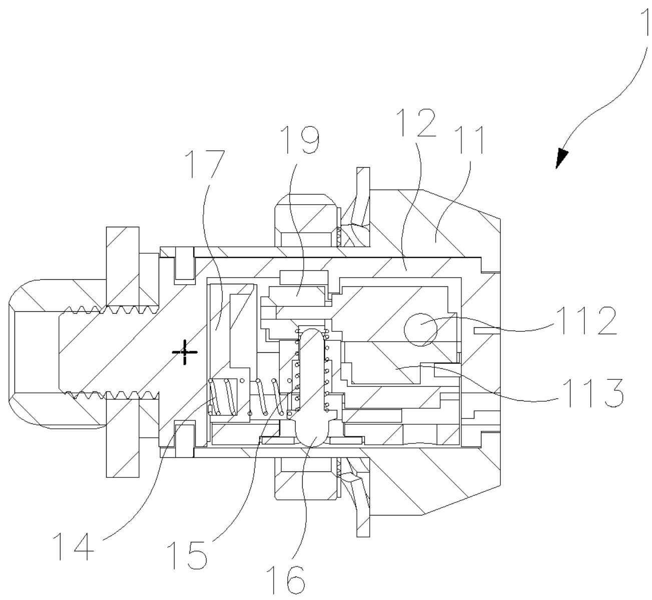
FIG. 4 is a side view of the present invention in a locked state.
Figure 5:
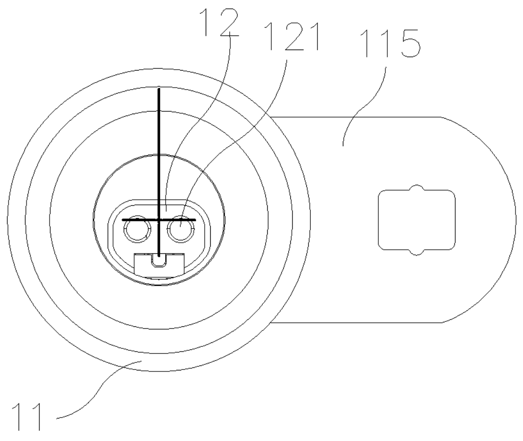
FIG. 5 is a cross-sectional view of the present invention in an unlocked state.
Figure 6:
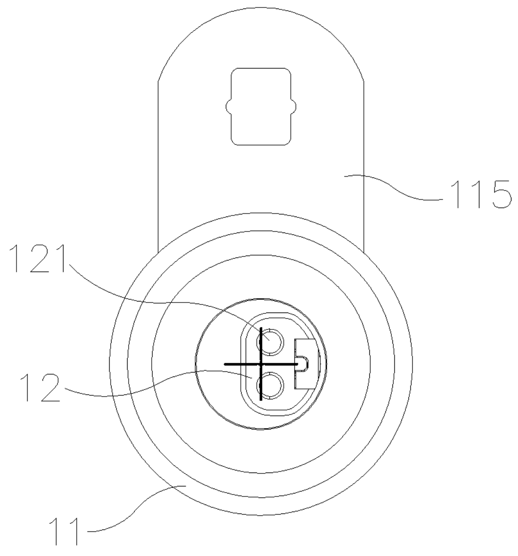
FIG. 6 is a side view of the present invention in an unlocked state.

As shown in FIG. 1, the present invention discloses an automatically resettable passive swing bolt lock consisting of a lock body 1 and a key 2. The key 2 is configured to be inserted into a locking hole of the lock body 1.

As shown in FIG. 2 through FIG. 6, the lock body 1 comprises a lock housing 11, a rotary compartment 12, a lock cover 13, a reset spring 14, a pin spring 15, a pin 16, a reset pusher block 17, a motor 18, a cam 19, a lock body PCB 110, a fixing plate 111, a steel ball 112, two locking contacts 113, a grounding conductor 114, a tongue 115, and a tongue nut 116.

The lock cover 13 is buckled on the rotary compartment 12. A rotary compartment internal cavity is formed between the lock cover 13 and the rotary compartment 12. The rotary compartment 12 with the lock cover 13 is rotatably fitted in the lock housing 11. The outer end of the rotary compartment 12 is provided with two conductive holes 121. The cam 19 is fixedly sleeved on an output shaft of the motor 18. The motor 18 is fixedly fitted in the rotary compartment internal cavity. The two locking contacts 113 are movably fitted in the two conductive holes 121 of the rotary compartment 12. The outer ends of the locking contacts 113 face a key hole on the lock housing 11. The inner ends of the locking contacts 113 are electrically connected to the motor 18. The reset pusher block 17 is movably fitted in the rotary compartment internal cavity to be moved back and forth in a longitudinal direction. The outer end face of the reset pusher block 17 faces the key hole of the lock housing 11. The inner end of the reset pusher block 17 is movably fitted with the cam 19. The reset spring 14 is disposed between the reset pusher block 17 and the wall of the rotary compartment internal cavity. The upper portion of the pin 16 is movably fitted on the lock cover 13 along a lateral direction. The lower end of the pin 16 abuts against the cam 19. The pin spring 15 is sleeved on the pin 16. Two ends of the pin spring 15 lean against the lock cover 13 and the cam 19, respectively. The steel ball 112 is movably fitted in the rotary compartment internal cavity, and the steel ball 112 is located on the side wall of the key hole of the rotary compartment 12. Both the lock body PCB 110 and the grounding conductor 114 are installed in the rotary compartment internal cavity. The lock body PCB 110 is electrically connected to the motor 18 and the locking contacts 113. The grounding conductor 114 is in contact with the reset pusher block 17. The fixing plate 111 is fitted in the rotary compartment internal cavity. The fixing plate 111 is movably sleeved on the outer end of the pin 16. The tongue 115 is fixedly connected to the inner end of the rotary compartment 12 through the tongue nut 116.

It should be noted that the grounding conductor 114 may be in different manners, as long as the key 2 is inserted to form a loop with the lock body PCB110. For example, it may be connected to the lock housing 11 with a circuit board, and the lock housing 11 is in contact with the key 2. Alternatively, the reset pusher block 17 has an inclination. Only when the key 2 is inserted, the reset pusher block 17 is to be in contact with the grounding conductor 114, not having to be in contact all the time.

Figure 8:
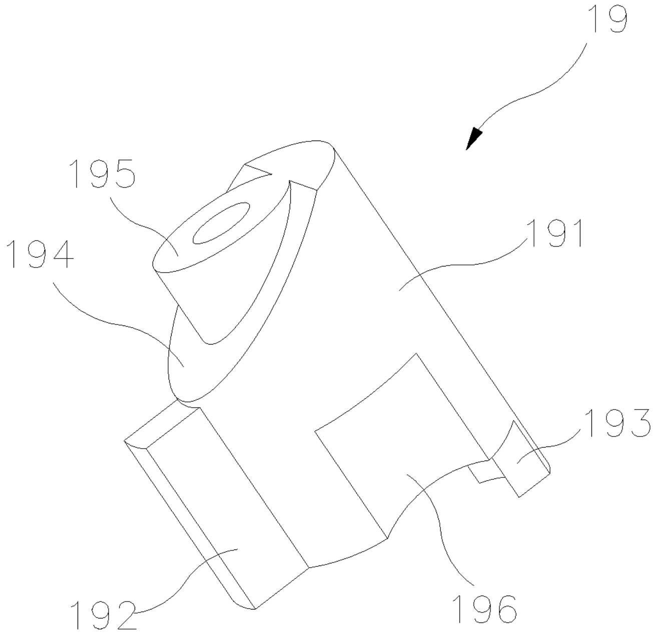
FIG. 8 is a perspective view of the cam of the present invention.

As shown in FIG. 8, the cam 19 has a cam body 191, a cam engaging block 192, a cam limiting block 193, a cam inclined surface 194, a cam cylindrical surface 195, and a cam arcuate groove 196. The cam limiting block 193 extends outwardly from the outer end of the cam body 191. The cam arcuate groove 196 is formed on the outer wall of the cam body 191. The cam engaging block 192 extends outwardly from the side wall of the cam body 191. The cam inclined surface 194 is formed on the inner end of the cam body 191. The cam cylindrical surface 195 protrudes inwardly from the cam inclined surface 194.

Figure 7:
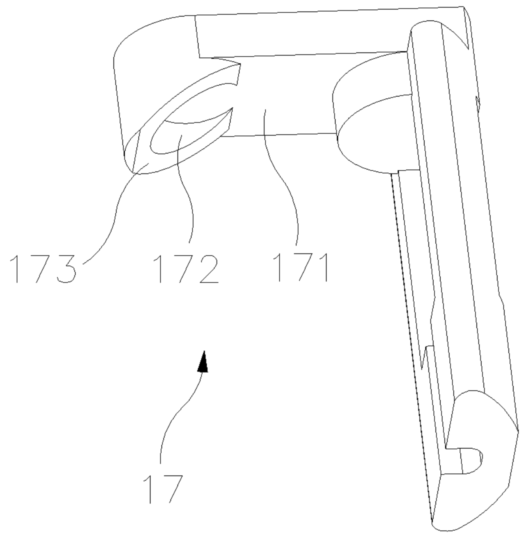
FIG. 7 is a perspective view of the reset pusher block of the present invention.

As shown in FIG. 7, the reset pusher block 17 is an L-shaped member. The L-shaped member has a vertical section 171. The inner side wall of the vertical section 171 is provided with an arcuate sleeve 172. The arcuate sleeve 172 has an inclined end face 173. The inclined end face 173 of the arcuate sleeve 172 cooperates with the cam cylindrical surface 195 of the cam 19 to be engaged with or disengaged from each other.

Figure 9:
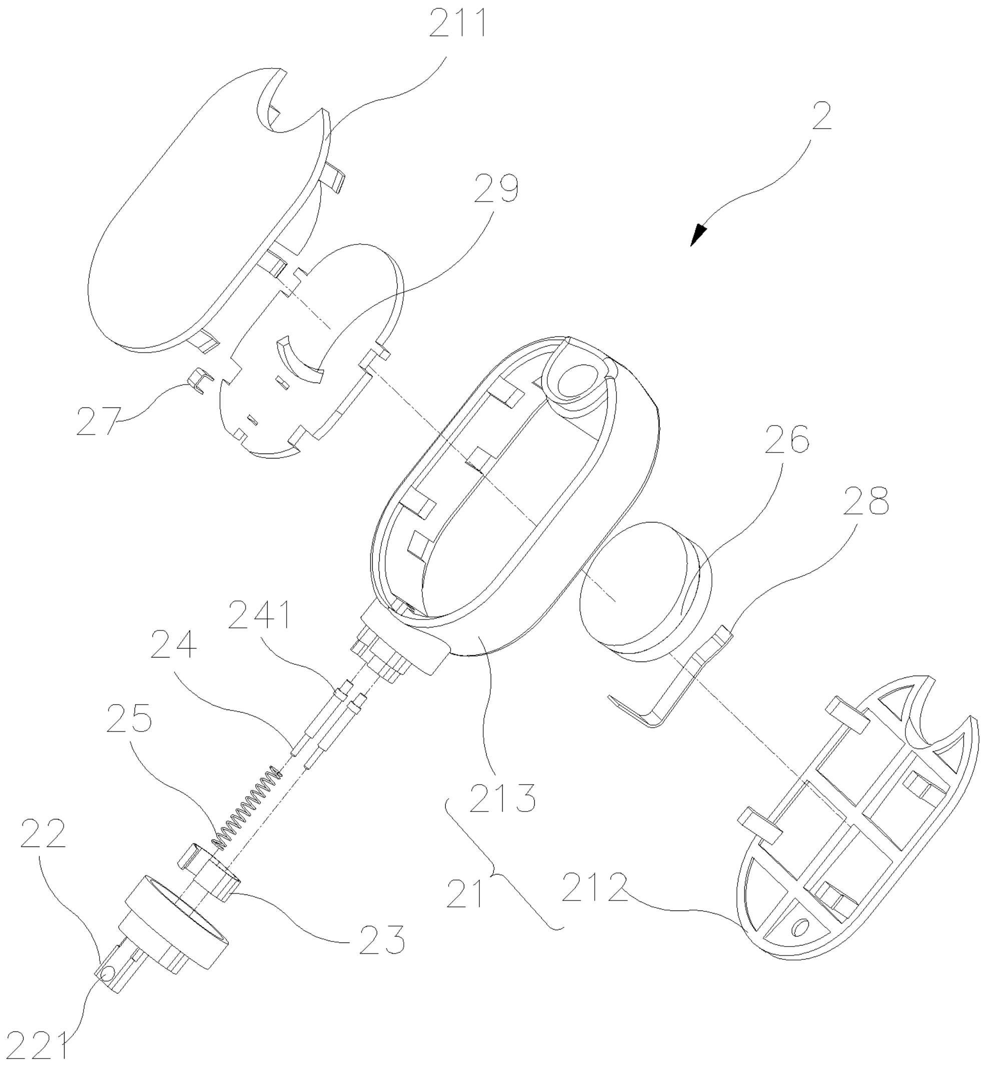
FIG. 9 is an exploded view of the key of the present invention.

As shown in FIG. 9, the key 2 includes a key housing 21, a key head 22, a guide plate 23, two return pins 24, a grounding spring 25, a battery 26, a grounding elastic plate 27, an electrode elastic plate 28, and a key PCB 29. The key head 22 is fixed at the front end of the key housing 21. The front end of the key head 22 is formed with a steel ball groove 221 for the steel ball 112 in the lock body 1 to be engaged therein. The guide plate 23 is movably fitted in the key head 22. The return pins 24 are movably inserted in guide holes of the key head 22. The grounding spring 25 is sleeved on the corresponding return pin 24. Two ends of the grounding spring 25 are respectively pressed against a flange 241 of the corresponding return pin 24 and the key housing 21 to provide a spring force to push the corresponding return pin 24 outwardly. The battery 26 is installed in the key housing 21. Both the grounding elastic plate 27 and the electrode elastic plate 28 are installed on the inner wall of the key housing 21. The grounding elastic plate 27 and the electrode elastic plate 28 are in contact with two electrodes of the battery 26 respectively, and are electrically connected to the key PCB 29 and the two return pins 24 through wires.

The key housing 21 is composed of a key top cover 211, a key bottom cover 212 and a cover body 213. The key top cover 211 and the key bottom cover 212 are fixed to the top and the bottom of the cover body 213, respectively.

The working principle of the present invention is described below.

When the key 2 is inserted in the lock body 1, the key head 22 pushes the reset pusher block 17 to complete the connection of the grounding terminal. The grounding conductor 114 is always in contact with the reset pusher block 17. While the reset pusher block 17 is pushed in place, the return pins 24 on the key 2 are in contact with the locking contacts 113 of the lock body 1. When the reset pusher block 17 is in place, the inclined end face 173 of the arcuate sleeve 172 of the reset pusher block 17 is separated from the cam inclined surface 194 of the cam 19 to make the restriction invalid. The key 2 supplies power to the lock body 1 and drives the motor 18 after the signal transmission is completed. After the motor 18 drives the cam 19 to rotate 90 degrees, the cam limiting block 193 is limited by a limiting surface 123 of the rotary compartment 12 and the cam arcuate groove 196 of the cam 19 is aligned with the pin 16, so that the restriction of the pin 10 fails. At this time, the key 2 is turned to drive the rotary compartment 12. The pin 16 has a free displacement toward the axis due to the failure of restriction of the cam 19. When the rotary compartment 12 is rotated, the head of the pin 16 slides relative to the arcuate groove on the inner wall of the lock housing 11 to move the pin 16 toward the axis, thereby failing the rotation restriction inside the lock and unlocking. When the key 2 is inserted, the steel ball 112 slides into the steel ball groove 221 of the key head 22. After the key 2 is turned, the steel ball 112 is engaged in the steel ball groove 221, so that the key 2 cannot be pulled out. When the key 2 is turned back to the initial position, the pin 16 is reset by the pin spring 15, the restriction of the steel ball 112 is invalid, and the key 2 is pulled out. The reset pusher block 17 is reset by the reset spring 14 when the key 2 is pulled out. The inclined end face 173 of the reset pusher block 17 is in cooperation with the cam inclined surface 194 of the cam 19 to reset the cam 19. After the cam 19 is reset, the restriction of the pin 16 becomes effective, and the lock is locked. The arcuate sleeve 172 of the reset pusher block 17 is fitted with the cam cylindrical surface 195 of the cam 19 to ensure that the center of the inclined end face 173 of the reset pusher block 17 coincides with the axis of the cam 19. The inner end face of the cam 19 coincides with the vertical section 171 of the reset pusher block 17 to ensure that the cam 19 will not be tilted due to the matching relationship between the elastic force of the reset spring 14 and the inclined end surface 173. The cam engaging block 192 cooperates with the limiting surface 123 of the rotary compartment 12 to prevent the motor 18 from turning incorrectly and failing to unlock. A rotary compartment surface 122 cooperates with the circumferential surface of the motor 4 to prevent that when the rotary compartment 12 is twisted violently, the pin 16 is against the cam 19 and the cam 19 is displaced to cause a false locking.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. An automatically resettable passive swing bolt lock, consisting of a lock body and a key, the key being configured to be inserted into a locking hole of the lock body;

the lock body comprising a lock housing, a rotary compartment, a lock cover, a reset spring, a pin spring, a pin, a lock body PCB, a motor, a cam, a reset pusher block, and two locking contacts; the lock cover being buckled on the rotary compartment, a rotary compartment internal cavity being formed between the lock cover and the rotary compartment, the rotary compartment with the lock cover being rotatably fitted in the lock housing, an outer end of the rotary compartment being provided with two conductive holes; the cam being fixedly sleeved on an output shaft of the motor, the motor being fixedly fitted in the rotary compartment internal cavity, the two locking contacts being movably fitted in the two conductive holes of the rotary compartment, outer ends of the locking contacts facing a key hole of the lock housing, inner ends of the locking contacts being electrically connected to the motor, the reset pusher block being movably fitted in the rotary compartment internal cavity to be moved back and forth in a longitudinal direction, an outer end face of the reset pusher block facing the key hole of the lock housing, an inner end of the reset pusher block being movably fitted with the cam, the reset spring being disposed between the reset pusher block and a wall of the rotary compartment internal cavity, an upper portion of the pin being movably fitted on the lock cover along a lateral direction, a lower end of the pin abutting against the cam, the pin spring being sleeved on the pin, two ends of the pin spring leaning against the lock cover and the cam, respectively; the lock body PCB being installed in the rotary compartment internal cavity, the lock body PCB being electrically connected to the motor and the locking contacts.

2. The automatically resettable passive swing bolt lock as claimed in claim 1, further comprising a steel ball and a grounding conductor; the steel ball being movably fitted in the rotary compartment internal cavity and the steel ball being located on a side wall of the key hole of the rotary compartment, the grounding conductor being installed in the rotary compartment internal cavity and the grounding conductor being in contact with the reset pusher block.

3. The automatically resettable passive swing bolt lock as claimed in claim 1, wherein the cam has a cam body, a cam engaging block, a cam limiting block, a cam inclined surface, a cam cylindrical surface, and a cam arcuate groove; the cam limiting block extends outwardly from an outer end of the cam body, the cam arcuate groove is formed on an outer wall of the cam body, the cam engaging block extends outwardly from a side wall of the cam body, the cam inclined surface is formed on an inner end of the cam body, and the cam cylindrical surface protrudes inwardly from the cam inclined surface.

4. The automatically resettable passive swing bolt lock as claimed in claim 1, wherein the reset pusher block is an L-shaped member, the L-shaped member has a vertical section, an inner side wall of the vertical section is provided with an arcuate sleeve, and the arcuate sleeve has an inclined end face matched with the cam cylindrical surface of the cam.

5. The automatically resettable passive swing bolt lock as claimed in claim 1, further comprising a fixing plate, a tongue, and a tongue nut; the fixing plate being fitted in the rotary compartment internal cavity, the fixing plate being movably sleeved on an outer end of the pin; the tongue being fixedly connected to an inner end of the rotary compartment through the tongue nut.

6. The automatically resettable passive swing bolt lock as claimed in claim 1, wherein the key includes a key housing, a key head, a guide plate, two return pins, a grounding spring, a battery, a grounding elastic plate, an electrode elastic plate, and a key PCB; the key head is fixed at a front end of the key housing, a front end of the key head is formed with a steel ball groove for the steel ball in the lock body to be engaged therein, the guide plate is movably fitted in the key head, the return pins are movably inserted in guide holes of the key head, the grounding spring is sleeved on the corresponding return pin, two ends of the grounding spring are respectively pressed against a flange of the corresponding return pin and the key housing to provide a spring force to push the corresponding return pin outwardly, the battery is installed in the key housing, the grounding elastic plate and the electrode elastic plate are installed on an inner wall of the key housing, the grounding elastic plate and the electrode elastic plate are in contact with two electrodes of the battery respectively, and are electrically connected to the key PCB and the two return pins through wires.

* * * * *